E. W. STULL.
CONTROLLER.
APPLICATION FILED FEB. 15, 1908.

900,612.

Patented Oct. 6, 1908.
2 SHEETS—SHEET 1.

Witnesses
Oliver J. Harman
Fred J. Kinsey

Inventor
Emmett W. Stull
By
Chas. E. Lord
Attorney

E. W. STULL.
CONTROLLER.
APPLICATION FILED FEB. 15, 1908.

900,612.

Patented Oct. 6, 1908.

2 SHEETS—SHEET 2.

Witnesses
Oliver J. Harman
Fred J. Kinsey

Inventor
Emmett W. Stull
By
Chas. E. Lord
Attorney

UNITED STATES PATENT OFFICE.

EMMETT W. STULL, OF NORWOOD, OHIO, ASSIGNOR TO ALLIS-CHALMERS COMPANY, A CORPORATION OF NEW JERSEY.

CONTROLLER.

No. 900,612.   Specification of Letters Patent.   Patented Oct. 6, 1908.

Application filed February 15, 1908. Serial No. 416,005.

*To all whom it may concern:*

Be it known that I, EMMETT W. STULL, a citizen of the United States, residing at Norwood, in the county of Hamilton and State of Ohio, have invented certain new and useful Improvements in Controllers, of which the following is a full, clear, and exact specification.

My present invention relates to electric controllers and is an improvement over that shown in my Patent No. 852,468 granted May 7, 1907.

In my prior patent a controller is described in which there are two series-parallel controlling drums arranged to operate together and each controlling a resistance and a plurality of motors, a combined series-parallel and cut-out switch for connecting the two drums and with their respective motors either in series or in parallel relation and to cut out either one of said drums and its associated motors, and a reversing switch. The two series-parallel controlling drums, the combined series-parallel and cut-out drum, and the reversing drum are properly interlocked. But it is found that when the two drums and their associated motors are connected in series the resistances associated with the two drums are of too great value although perfectly proportionate when the drums are connected in parallel.

It is the object of my present invention to improve upon the construction and arrangement shown and described in my prior patent. This is done by providing means on the combined series-parallel and cut-out drum for cutting out part of the resistance associated with the series-parallel and resistance drums when the two series-parallel and resistance drums and their associated groups of motors are in series. In addition, the reversing drum and the series-parallel and cut-out drum are in vertical alinement with each other and behind and midway between the two series-parallel and resistance drums, thus making the controller as a whole of small size.

The various novel features of my invention will appear from the description and drawings and will be particularly pointed out in the claims.

Figure 1:
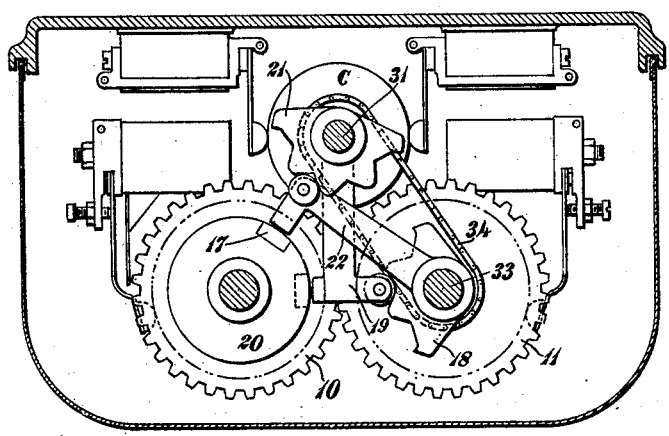
Figure 2:
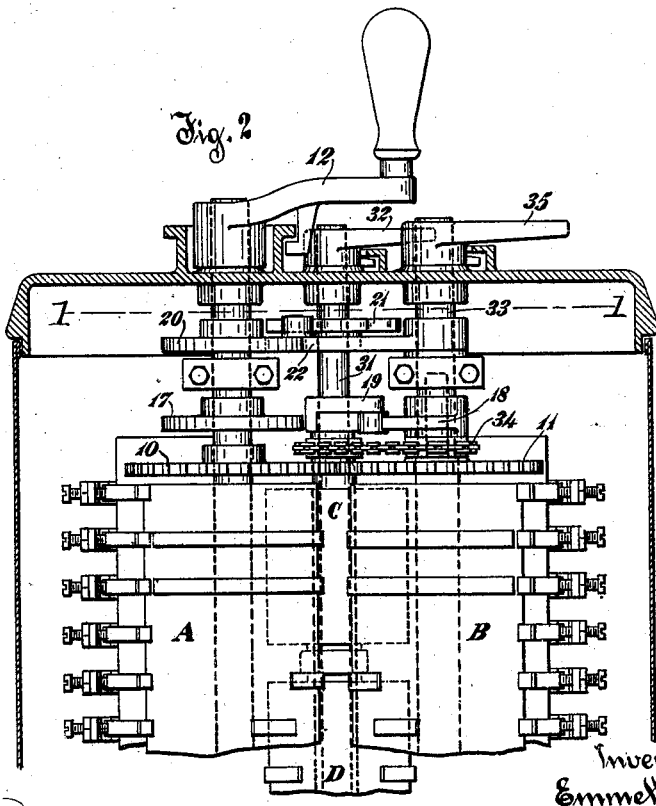
Figure 3:
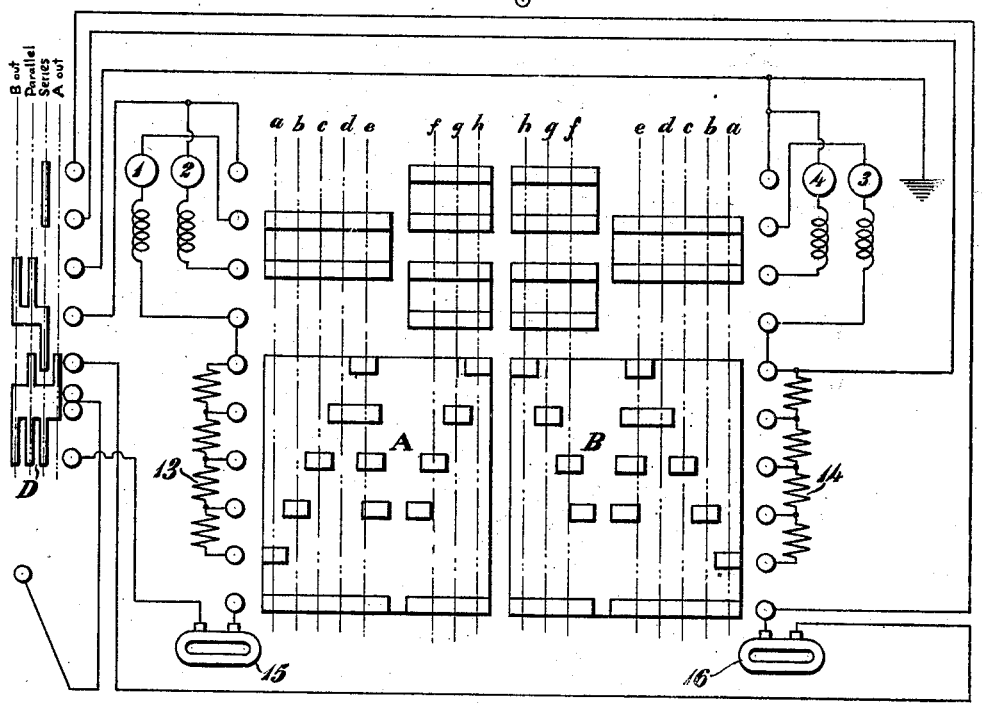
Figure 4:
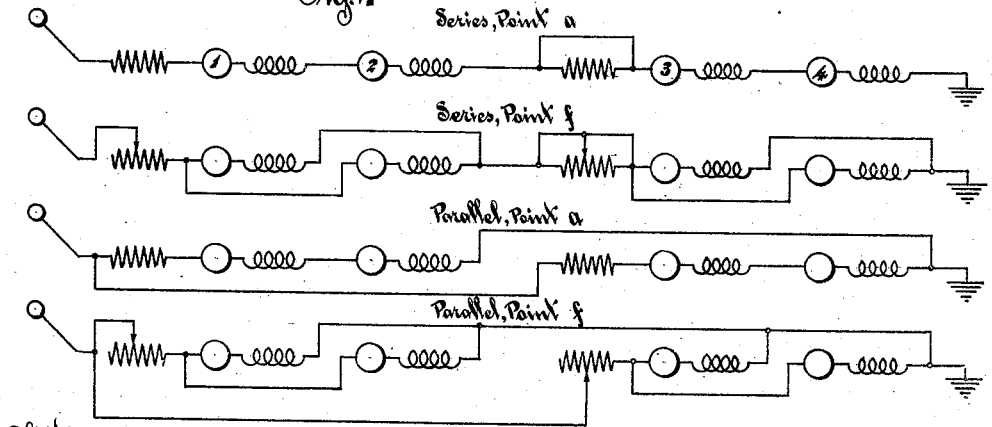

Figure 1 is a section on the line 1—1 of Fig. 2, showing a controller constructed in accordance with my invention; Fig. 2 is a partial front elevation of such controller, with the casing in section; Fig. 3 is a diagram of the electrical connections, the reversing switch and its connections being omitted for simplicity; and Fig. 4 is a series of simple diagrams showing the connections for certain positions of the various controlling drums.

The two controller drums A and B are connected, as by gear wheels 10 and 11, to be simultaneously operated in opposite directions by a single handle 12. The handle 12 may be arranged as usual so that it can be removed only when the controller is in off position. The drums A and B may be of any desired type, and are here shown as series-parallel drums, the drum A controlling motors 1 and 2 through series and parallel positions while the drum B controls the motors 3 and 4 in the same way. These drums have their own variable resistances 13 and 14 respectively, and their own blow-out coils 15 and 16 respectively. A drum-type reversing switch C is provided as usual and is mounted and interlocked as hereinafter described. The connections of the reversing switch are the usual ones and are omitted from the diagram of connections (Fig. 3) in order to simplify the latter. A fourth drum-type switch D is also provided, this drum having four operative positions, as indicated in Fig. 3. In the position marked "Series" it connects the two drums A and B and their associated motors in series with each other, the drums A and B respectively controlling the series and parallel connections of the motors 1 and 2, and 3 and 4. When the drum D is in this position the resistance 14 is short-circuited so that the resistance 13 alone gives the resistance variations for all four of the motors. When the drum D is in the position marked "Parallel", the drums A and B with their associated motors are in parallel with each other, each of the drums A and B controlling the individual connections of the motors under its control and also controlling the resistance 13 or 14 associated with such motors. The two positions of drum D which have just been described are the inner or middle positions of such drums. In one of the extreme positions, marked "A out", the drum A and the motors 1 and 2 controlled thereby are cut out. In the other extreme position, marked "B out", the drum B and the motors 3 and 4 controlled thereby are cut out.

The drums C and D are arranged one above the other on the same axis, the shaft 31 of the drum D extending through the sleeve on which the drum C is mounted and through the top of the controller casing to receive the handle 32. The sleeve carrying the drum C is connected to the shaft 33 by sprocket wheels and chain 34, and the shaft 33 extends through the top of the controller to receive the handle 35. The upper end of the shaft of the controller drum B is shown as being journaled in a socket in the lower end of the shaft 33, these two shafts being in alinement. The handle 32 is preferably removable when the drum D is in any operative position, while the handle 35 can be removed only when the reversing switch C is in off position.

The drum C is interlocked with the drum A by means of a disk 17, notch plate 18 on shaft 33, and swinging lever 19 loosely pivoted on shaft 31, thus being movable only when the drum A is in off position. The drum D is interlocked with the drum A by means of the disk 20, notch plate 21 on shaft 31, and swinging lever 22 loosely pivoted on shaft 33, thus also being movable only when the drum A is in off position. By means of these two interlocks the drums C and D can be moved only when the connections of the motors are broken at the drums A and B. The drum D thus provides for the connection of the drums A and B in series for slow speed city traffic and in parallel for high speed interurban traffic, and also provides for the cutting out of either drum and its associated motors in case such cutting out should be necessary for any reason. When either drum is cut out it and its motors are entirely disconnected, while the connections of the other drum and its associated motors are not affected in the slightest. Moreover, the short-circuiting of the resistance 14 when the drum D is in series position gives a better regulation of the motors than is ordinarily obtained when this resistance is not cut out.

Many modifications in the precise arrangement shown and described may be made without departing from the spirit and scope of my invention, and all such I aim to cover in the following claims.

What I claim as new is:—

1. In combination, a plurality of regulating switches, a motor and its regulating resistance under the control of each of said switches, and another switch arranged to connect the first mentioned switches and the motors controlled thereby in series and in multiple and to cut out the regulating resistance associated with one of said motors when the switches are connected in series.

2. In combination, a plurality of regulating switches, a motor and its regulating resistance under the control of each of said switches, and another switch arranged to connect the first mentioned switches and the motors controlled thereby in series and in multiple and to short-circuit all save one of the regulating resistances associated with said motors.

3. In combination, a plurality of drums, each drum being arranged to control one or more motors and a regulating resistance therefor, and a switch arranged to connect said drums and their associated motors in series and in parallel and to short-circuit the regulating resistance associated with less than all of said drums when said drums are connected in series.

4. In combination, a plurality of regulating switches connected to operate together, a motor and its regulating resistance under the independent control of each of said switches, and another switch arranged to connect said first mentioned switches in series or in parallel, cutting out the resistance associated with one of said first mentioned switches when the first mentioned switches are in series, and to cut out any one of the first mentioned switches and the motor controlled thereby.

5. In combination, a plurality of drums connected to operate together, each of said drums being connected and arranged to independently control one or more motors by means of a resistance, and a switch arranged to cut out any one of said drums and the motor or motors controlled thereby, to connect said drums with their associated motors either in series or in parallel, and to render the resistance associated with one of said drums ineffective when said drums are in series.

6. In combination, a plurality of series-parallel regulating switches, a plurality of motors and a regulating resistance therefor under the control of each of said switches, and another switch arranged to connect said first mentioned switches with their associated motors in series and in parallel and to cut out the resistance associated with one of said series-parallel switches when the latter with their associated motors are connected in series.

7. In combination, a plurality of series-parallel regulating switches, a plurality of motors and a regulating resistance therefor under the control of each of said switches, and another switch arranged to connect said first mentioned switches and their associated motors in series and in parallel, to cut out the resistance associated with one of said series-parallel switches when the latter with their associated motors are connected in series, and to cut out any one of said series-parallel switches and its associated motors.

8. In combination, a plurality of regulating switches, a motor and its regulating resistance under the control of each of said switches, and another switch arranged to connect the first mentioned switches and the motors controlled thereby in either series or parallel and to cut out part of the resistance when said switches and their associated motors are connected in series, said other switch being also arranged to cut out any of said first mentioned switches.

9. In combination, a plurality of regulating switches, a motor and its regulating resistance under the control of each of said switches, and another switch arranged to connect the first mentioned switches and the motors controlled thereby in either series or parallel and to cut out part of the resistance when said switches and their associated motors are connected in series.

10. In combination, a plurality of series-parallel controlling drums, a plurality of motors under the control of each of said drums and arranged to be connected in series or parallel thereby, a regulating resistance also under the control of each of said drums, and a switch arranged to connect said drums and their associated motors in series and in parallel and to cut out any one of said drums and its associated motors, said last named switch being also arranged to cut out part of said resistances when said drums and their associated motors are connected in series.

11. In combination, a plurality of series-parallel controlling drums, a plurality of motors under the control of each of said drums and arranged to be connected in series or parallel thereby, a regulating resistance also under the control of each of said drums, and a switch arranged to connect said drums and their associated motors in series and in parallel, said last named switch being also arranged to cut out part of said resistances when said drums and their associated motors are connected in series.

12. In a controller, a plurality of motor-regulating drums, a switch for connecting said drums in series or in parallel relation, and a reversing switch, said last two switches being arranged in vertical alinement.

13. In a controller, the combination of a plurality of series-parallel controlling drums, a drum-type switch for connecting said first mentioned drums either in series or in parallel, and a drum-type reversing switch, said last two switches being rotatable on the same axis.

14. In a controller, the combination of a plurality of series-parallel controlling drums, a drum-type switch for connecting said first mentioned drums either in series or in parallel, a drum-type reversing switch, said last two switches being rotatable on the same axis, and means for operating each of said switches from the top of the controller.

15. In a controller, two motor-controlling drums, a drum-type switch for connecting said first mentioned drums in series or in parallel, and a drum-type reversing switch, the last two switches being arranged with their shafts in alinement.

16. In a controller, two motor controlling drums, a drum-type switch for connecting said first mentioned drums in series or in parallel, a drum-type reversing switch, the last two switches being arranged with their shafts in alinement, and means for operating all of said drums from the top of the controller.

In testimony whereof I affix my signature, in the presence of two witnesses.

EMMETT W. STULL.

Witnesses:
  GEO. B. SCHLEY,
  FRED J. KINSEY.